(12) United States Patent
Masfaraud et al.

(10) Patent No.: US 12,176,773 B2
(45) Date of Patent: Dec. 24, 2024

(54) ROTARY ELECTRIC MACHINE WITH IMPROVED STATOR COOLING

(71) Applicant: NIDEC PSA EMOTORS, Carrieres sous Poissy (FR)

(72) Inventors: Julien Masfaraud, Montreuil (FR); Tahar Hamiti, Montigny le Bretonneux (FR); Hussain Nouri, Nanterre (FR); Ioan Deac, Poissy (FR)

(73) Assignee: Nidec PSA Emotors, Carrieres sous Poissy (FR)

( * ) Notice: Subject to any disclaimer, the term of this patent is extended or adjusted under 35 U.S.C. 154(b) by 575 days.

(21) Appl. No.: 17/310,317

(22) PCT Filed: Feb. 25, 2020

(86) PCT No.: PCT/FR2020/050362
§ 371 (c)(1),
(2) Date: Jul. 27, 2021

(87) PCT Pub. No.: WO2020/174180
PCT Pub. Date: Sep. 3, 2020

(65) Prior Publication Data
US 2022/0123615 A1   Apr. 21, 2022

(30) Foreign Application Priority Data

Feb. 28, 2019   (FR) ...................................... 1902099

(51) Int. Cl.
*H02K 3/24* (2006.01)
*H02K 9/19* (2006.01)
(52) U.S. Cl.
CPC ................. *H02K 3/24* (2013.01); *H02K 9/19* (2013.01)

(58) Field of Classification Search
CPC .............. H02K 1/20; H02K 1/32; H02K 1/16; H02K 1/165; H02K 9/19; H02K 9/193;
(Continued)

(56) References Cited

U.S. PATENT DOCUMENTS

| 4,994,700 A | 2/1991 | Bansal et al. |
| 2006/0119196 A1* | 6/2006 | Konishi ................... H02K 3/24 310/64 |
| 2008/0042498 A1 | 2/2008 | Beer |
| 2016/0028284 A1 | 1/2016 | Dajaku |

(Continued)

FOREIGN PATENT DOCUMENTS

| EP | 1102383 A2 | 5/2001 |
| JP | 2003061285 A | 2/2003 |

(Continued)

OTHER PUBLICATIONS

International Search Report for PCT/fr2020/050362 mailed Jun. 30, 2020.
Written Opinion for PCT/fr2020/050362 mailed Jun. 30, 2020.

*Primary Examiner* — Bryan R Perez
(74) *Attorney, Agent, or Firm* — Sandberg Phoenix & von Gontard P.C.

(57) ABSTRACT

The rotary electric machine (1) comprises a casing (10), a stator (40) comprising a stator body (41) secured within the casing and comprising first (411) and second (412) longitudinal end faces, notches (44) arranged and extending longitudinally within the stator body between the first and second longitudinal end faces, a coil passing longitudinally through the stator body through the notches and comprising first (43) and second (42) coil head assemblies extending in projection from at least one of the first and second longitudinal end faces of the stator body, a first chamber (15) in the shape of a ring portion arranged around the first coil head assembly and a second chamber (14) in the shape of a ring (Continued)

portion arranged around the second coil head assembly, the first and second chambers being in fluid communication with one another by the notches, one among the first and second chambers being a coolant inlet chamber and the other among the first and second chambers being a coolant discharge chamber such that a flow of coolant between the first and second annular chambers is forced into the notches while the rotary electric machine is in operation.

18 Claims, 3 Drawing Sheets

(58) Field of Classification Search
CPC ...... H02K 55/04; H02K 5/203; H02K 5/1732; H02K 5/225; H02K 3/24; H02K 3/12; H02K 3/522; H02K 3/22
See application file for complete search history.

(56) References Cited

U.S. PATENT DOCUMENTS

| 2016/0065035 A1* | 3/2016 | Nakamura | H02K 3/38 |
| | | | 310/59 |
| 2017/0271956 A1* | 9/2017 | Hanumalagutti | H02K 9/197 |

FOREIGN PATENT DOCUMENTS

| JP | 2004023806 A | 1/2004 |
| WO | 9200627 A1 | 1/1992 |
| WO | 2007040384 A1 | 4/2007 |
| WO | 2017050577 A1 | 3/2017 |
| WO | 2018167294 A1 | 9/2018 |
| WO | 2018211096 A1 | 11/2018 |
| WO | 2019011759 A1 | 1/2019 |

* cited by examiner

[Fig.1]
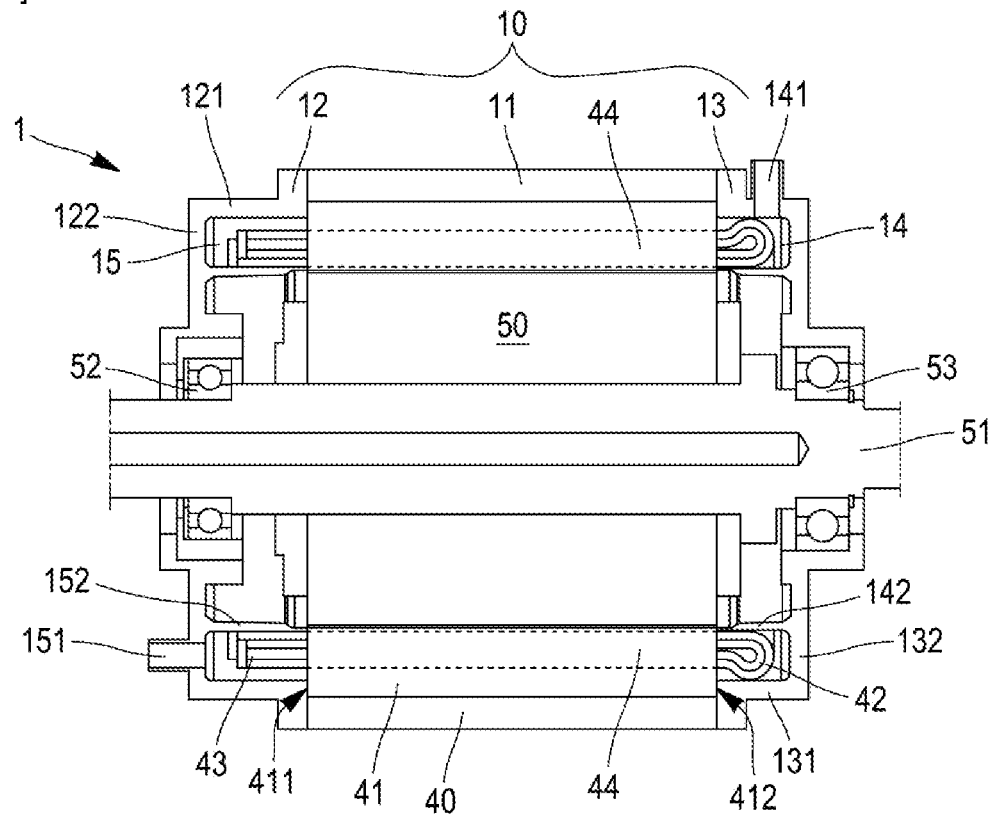
[Fig.2]
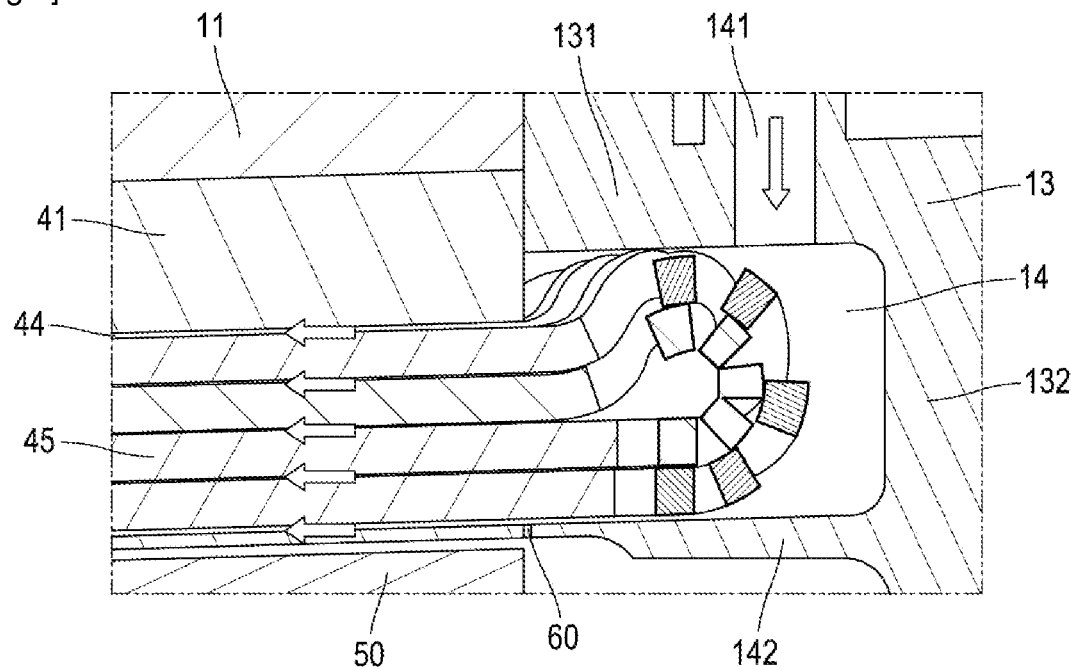

[Fig.3]
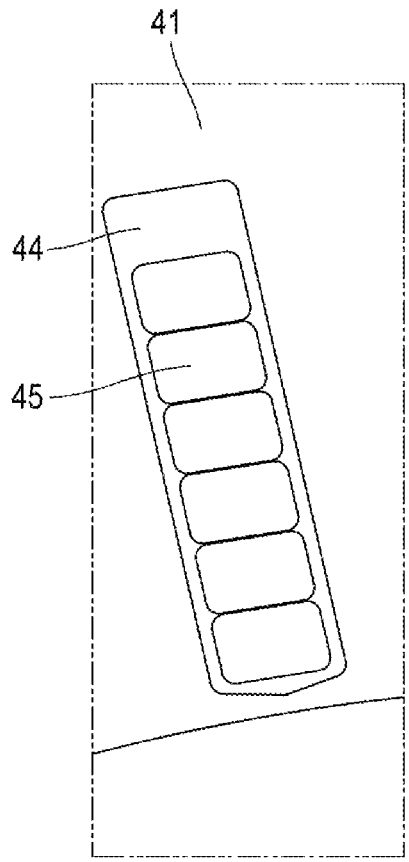
[Fig.4]
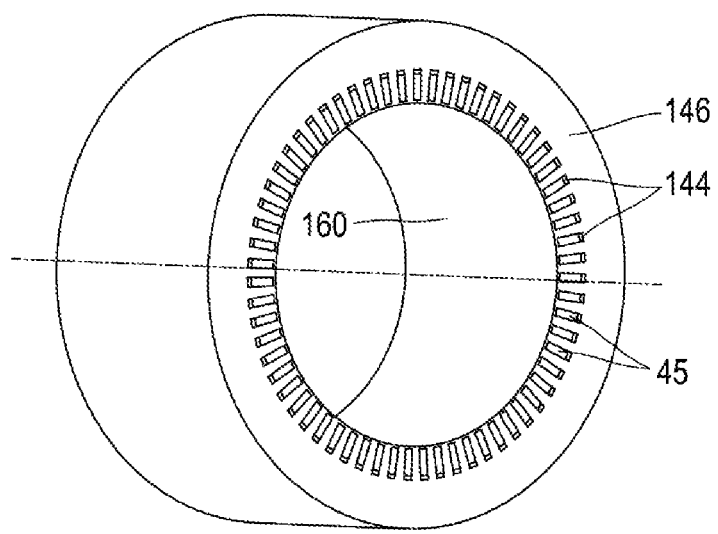

[Fig.5]
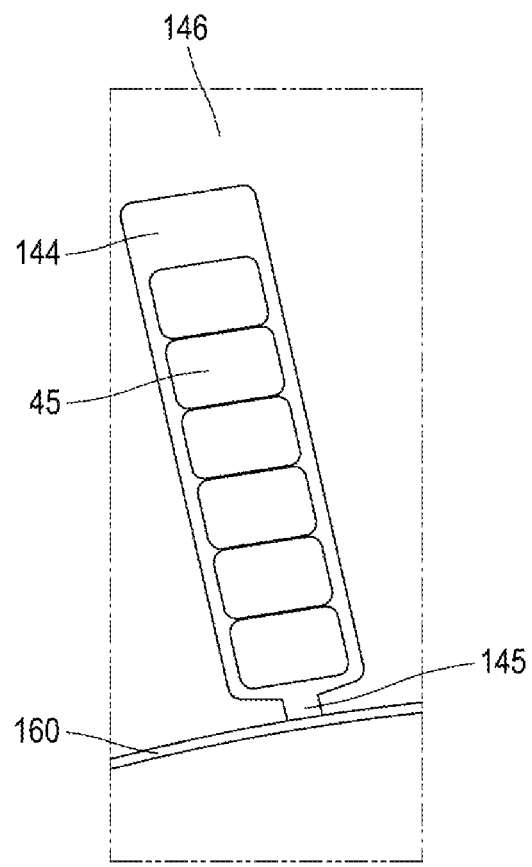

ROTARY ELECTRIC MACHINE WITH IMPROVED STATOR COOLING

CROSS-REFERENCE TO RELATED APPLICATIONS

This application is the US National Stage under 35 USC § 371 of International Application No. PCT/FR2020/050362, filed 25 Feb. 2020 which claims the priority of French application 1902099 filed on Feb. 28, 2019, the content of which (text, drawings and claims) is incorporated here by reference.

BACKGROUND

The invention relates to a rotary electric machine of the type comprising a casing and a stator clamped in the casing, as well as means for cooling the stator.

STATE OF THE ART

Currently, a rotary electric machine, such as a high-power electric motor for moving a motor vehicle, requires cooling means for its various component parts and in particular for the stator due to the high heat generation of such rotary machines. It is therefore necessary to be able to effectively cool the stator and in particular the coil. US 2006/0119196 discloses an electric motor which comprises a stator body made from a stack of magnetic blades or plates in which notches are provided for receiving the stator coil. These notches are oriented longitudinally. In order to cool the coil heads of the coil, the document describes the placement of liners defining, with the longitudinal end faces of the stator body, annular cooling chambers around the coil heads in which a coolant circulates between the turns of the coil heads. Each of the chambers thus formed comprises its own coolant inlet and outlet, which makes it possible to ensure controlled cooling of the coil heads. However, the part of the coil which is in the stator body is not cooled properly.

SUMMARY OF THE INVENTION

An object of the invention is to provide a rotary electric machine in which the stator coil is cooled in a controlled and optimal manner.

To this end, there is provided a rotary electric machine comprising a casing, a stator comprising a stator body secured within the casing and comprising first and second longitudinal end faces, notches arranged and extending longitudinally within the stator body between the first and second longitudinal end faces, a coil passing longitudinally through the stator body through the notches and comprising first and second coil head assemblies projecting from at least one of the first and second longitudinal end faces of the stator body, a first chamber in the shape of at least a portion of a ring arranged around the first coil head assembly and a second chamber in the shape of at least a portion of a ring arranged around the second coil head assembly, the first and second chambers being in fluid communication with one another by means of the notches, one of the first and second chambers being a coolant inlet chamber and the other of the first and second chambers being a coolant discharge chamber such that a flow of coolant between the first and second chambers is forced into the notches while the rotary electric machine is in operation.

Advantageously, but optionally, the rotary electric machine according to the invention has at least one of the following technical features:
  the first coil head assembly protrudes from one of the first and second longitudinal end faces and the second coil head assembly protrudes from the other of the first and second longitudinal end faces;
  the first and second chambers are annular chambers;
  the first and second coil head assemblies project from one of the first and second longitudinal end faces, the coil comprises a third coil head assembly projecting from the other of the first and second longitudinal end faces and the machine comprises a third chamber in the shape of at least a portion of a ring arranged around the third coil head assembly and in fluid communication with the first and second chambers through the notches;
  the third chamber is an annular chamber;
  the ring portions of the first and second chambers in combination form a complete ring;
  the first and second chambers are semi-annular chambers;
  the third chamber is delimited by a liner secured to a wall of the casing;
  the first and second chambers are delimited by a liner secured to a wall of the casing;
  the casing comprises first and second clamping members of the stator body, the liner being provided in the first and/or second clamping members;
  the machine comprises means for supplying coolant to the inlet chamber;
  the coolant supply means is positioned in the upper part of the casing;
  the machine comprises means for discharging coolant from the discharge chamber;
  the coolant discharge means is positioned in the lower part of the casing;
  sealing means is provided at a connection between the chambers and the notches;
  the sealing means comprises an annular seal located centripetally with respect to the notches;
  the notches have a closed shape in cross-section;
  the notches comprise a radially centripetal opening, the machine further comprising a jacket for closing the radially centripetal opening, coaxial with the stator body;
  the stator body comprises a longitudinal stack of stator blades or plates; and
  the coil comprises a set of pins.

The stator coil may comprise electrical conductors, at least some of these electrical conductors, or even a majority of these electrical conductors, being in the shape of a U-shaped or I-shaped pin.

The hairpin and flat electrical conductors increase the filling coefficient of the notch, making the machine more compact. Owing to a high filling coefficient, the thermal exchanges between the electrical conductors and the stator mass are improved, which makes it possible to reduce the temperature of the electrical conductors inside the notches. The energy efficiency of the electric machine is thus improved.

In addition, the manufacture of the stator can be facilitated by the electrical conductors in pin form. In addition, the coil with pins can be easily modified by changing only the connections between the pins at the coil heads. Finally, since the pins do not need to have open notches, it is possible to have closed notches which make it possible to hold the pins, and it is therefore possible to eliminate the step of inserting stator shims.

Some of the electrical conductors, or even a majority of electrical conductors, extend axially in the notches. The electrical conductors can be introduced into the corresponding notches by one or both axial ends of the machine.

An I-shaped electrical conductor has two axial ends each placed at one of the axial ends of the stator. It passes through a single notch, and can be welded at each of its axial ends to two other electrical conductors, at the axial ends of the stator. The stator may for example comprise six or twelve electrical conductors in the shape of an I, the other electrical conductors possibly all being in the shape of a U.

A U-shaped electrical conductor has two axial ends both placed at one of the axial ends of the stator. It passes through two different notches, and can be welded at each of its axial ends to two other electrical conductors, at the same axial side of the stator. The bottom of the U is placed on the other axial side of the stator.

Each electrical conductor comprises one or more strands (also called "wire"). "Strand" refers to the most basic unit for electrical conduction. A strand can be of round cross-section, which may then be called "wire," or flat. The flat strands can be shaped into pins, for example U-shaped or I-shaped pins. Each strand is coated with an insulating enamel.

The use of hairpin electrical conductors consisting of flattened strands rather than strands of round cross-section allows the speed of flow of the coolant to be increased in the notches. The product of the exchange surface with the heat transfer coefficient can thus be increased. As a result, the amount of energy transferred from the electrical conductors to the coolant increases. The cooling of the electrical conductors is thus improved.

The use of hairpin electrical conductors made up of flat strands rather than strands of round cross-section increases the contact area between the electrical conductors and the coolant. The removal of the heat dissipated by the electrical conductors in the stator mass is thus improved.

The use of hairpin electrical conductors makes it possible to improve the retention of the stator coil. The risk of displacement in the notch of the electrical conductors is then reduced. It is then possible to dispense with the usual step of impregnating the electrical conductors of the stator with an impregnation varnish. This makes it possible to save space inside the notches to allow the passage of the coolant in the notches. If an impregnation step is carried out, the varnish fills all the space available in the notches. It is then impossible to circulate a coolant therein.

The term "notch having a closed shape in cross-section" denotes notches which are not open radially toward the air gap.

The presence of the notches having a closed shape in cross-section makes it possible to improve the performance of the electric machine in terms of the quality of the magnetic field in the air gap, by minimizing the harmonic content and the eddy current losses in the electrical conductors, and the leakage fluxes in the notches, as well as the fluctuations of the magnetic field in the air gap and the heating of the machine. In addition, the presence of these notches having a closed shape in cross-section makes it possible to improve the mechanical rigidity of the stator, by mechanically reinforcing the stator and by reducing vibrations.

Such notches make it possible to ensure the tightness of the coolant circuit without using any attached part which would increase the mechanical air gap of the electric machine. This minimizes the impact that the presented cooling solution has on the torque necessary for the rotation of the electric machine.

The coolant can be a gas, for example air, or a liquid, for example water or oil.

BRIEF DESCRIPTION OF THE FIGURES

Other features and advantages of the invention will emerge on reading the following description of an embodiment of the invention. In the accompanying drawings:

FIG. 1 is a schematic sectional view of an embodiment of a rotary electric machine;

FIG. 2 is a detailed sectional view of part of one of the annular chambers of the machine of FIG. 1;

FIG. 3 is a detailed schematic sectional view of a notch, according to the first embodiment, of the stator body of the machine of FIG. 1;

FIG. 4 is a three-dimensional view of a stator body comprising a second embodiment of the notches; and FIG. 5 is a detailed schematic sectional view of a notch in FIG. 4.

DETAILED DESCRIPTION OF AN EMBODIMENT

With reference to FIGS. 1 to 3, we will describe an embodiment of a rotary electric machine 1 according to the invention.

The rotary electric machine 1 comprises a casing 10 formed, here, of a first casing cover 12, a casing body 11 and a second casing cover 13. The rotary electric machine 1 further comprises, provided within the casing 10, a rotor 50 mounted fixedly on a rotor shaft 51. The rotor shaft 51 is held in the casing 1, free to rotate, by a bearing 52 in the casing cover 12 and by a bearing 53 in the second casing cover 13.

Furthermore, the rotary electric machine 1 comprises a stator 40 fixedly mounted in the casing body 12 so as to completely surround the rotor 50. The stator 40 here comprises a stator body 41 and a coil 45 received longitudinally in the stator body 41 and having coil heads 42, 43 projecting longitudinally on either side of the stator body 41 from longitudinal end faces 411 and 412 of the stator body 41. The stator body 41 can be either a single piece or a stack of stator blades, sheets or plates.

The stator body 41 comprises a series of notches 44 extending longitudinally between the two longitudinal end faces 411, 412 in which the conductors of the coil 45 are received. The conductors can optionally be composed of multiple strands of electrically conductive material. In one embodiment, the coil 45 is formed from a set of pins of electrically conductive material. In cross-section, as illustrated in FIG. 3, each notch 44 has a radially elongated closed shape. Once the coil 45 is in place, there are gaps between the various conductors and/or strands of the coil 45 passing through the notch 44 and between said conductors and/or strands and side walls of the notch 44.

The casing body 11 here is of cylindrical shape and has a longitudinal dimension which is similar to a longitudinal dimension of the stator body 41, which here is clamped in the casing body 11. The first casing cover 12 comprises a liner 121, 122, 152 partially delimiting a first, here annular, cooling chamber 15. The liner comprises a side wall 121 of the first casing cover 12, a radially outer annular portion of a bottom wall 122 of the first casing cover 12 and a radially inner wall 152 projecting from the bottom wall 122 and opposite and spaced from the side wall 121. The wall 152 is secured to the first casing cover 12. Thus, the formed liner is secured to the first casing cover 12. During assembly of the rotary electric machine 1, the first casing cover 12 bears on the casing body 11 and on a radially outer part of the longitudinal end face 411 of the stator body 41 at a free end of the side wall 121 and on a radially inner part of the longitudinal end face 411 of the stator body 41 at a free end of the wall 152 of the liner. Thus, the liner of the first casing cover 12 associated with the longitudinal end face 411 of the stator body 41 forms the first, here annular, cooling chamber 15 in which the first coil heads 43 of the coil 45 extend. The first coil heads 43 then form a first coil head assembly. Consequently, the notches 44 open into the first annular chamber 15 at the longitudinal end face 411 of the stator body 41. Furthermore, the first casing cover 12 comprises fluid communication means 151 for coolant from the first annular cooling chamber 15. Here, the fluidic communication means 151 is a pipe portion extending longitudinally through the bottom wall 122 of the first casing cover 12 and located in the lower part of the casing 10.

Similarly, the second casing cover 13 comprises a liner 131, 132, 142 partly delimiting a second, here annular, cooling chamber 14. The liner comprises a side wall 131 of the second casing cover 13, a radially outer annular portion of a bottom wall 132 of the second casing cover 13 and a radially inner wall 142 projecting from the bottom wall 132 and opposite and spaced from the side wall 131. The wall 142 is secured to the second casing cover 13. Thus, the formed liner is secured to the second casing cover 13. During assembly of the rotary electric machine 1 according to the invention, the second casing cover 13 bears on the casing body 11 and on a radially outer part of the longitudinal end face 412 of the stator body 41 at a free end of the side wall 131 and on a radially inner part of the longitudinal end face 412 of the stator body 41 at a free end of the wall 142 of the liner. Thus, the liner of the second casing cover 13 associated with the longitudinal end face 412 of the stator body 41 forms the second, here annular, cooling chamber 14 in which the second coil heads 42 of the coil 45 extend. The second coil heads 42 then form a second coil head assembly. Consequently, the notches 44 open into the second annular chamber 14 at the longitudinal end face 412 of the stator body 41. Furthermore, the second casing cover 13 comprises fluid communication means 141 for coolant from the second annular cooling chamber 14. Here, the fluid communication means 141 is a pipe portion extending radially through the side wall 131 of the second casing cover 13 and located in the upper part of the casing 10.

It should be noted that during an assembly of a rotary electric machine 1 the first 12 and second 13 casing covers, respectively, form first and second clamping members of the stator body 41. Furthermore, to prevent any leakage of coolant outside the first 15 and second 14 cooling chambers, sealing means 60 is provided at a connection between the first 15 and second 14 chambers and the notches. More particularly, the sealing means 60 here is an annular seal which is sandwiched between the free end of the radial inner walls 152, 142, respectively, of the liner and the longitudinal end faces 411, 412, respectively, of the stator body 41. Thus, this prevents coolant from the cooling chambers from flowing toward an air gap present between the stator 40 and the rotor 50.

During operation, the coolant is, for example, introduced by the fluid communication means 141, which then becomes a coolant intake means, into the second cooling chamber 14, which then forms a coolant inlet chamber. Preferably, the coolant is injected under pressure so as to optimally occupy a volume of the second cooling chamber 14: thus, the second coil head assembly 42 is completely immersed in the coolant. Then, the coolant enters the notches 44 and flows around and along the conductors and/or strands of the coil 45 in the previously described gaps. This flow of coolant is illustrated by the arrows visible in FIG. 2. Then, the coolant leaves the notches 44 toward the first cooling chamber 15, which it fills completely, thus flooding the first coil head assembly 43 to, in turn, cool it optimally. The first cooling chamber 15 then forms a coolant discharge chamber. The coolant is finally discharged by the fluid communication means 151, which then become a means for discharging coolant.

In a variant, the circulation of the coolant can take place in the reverse manner.

With reference to FIGS. 4 and 5, we will briefly describe a second configuration of the rotary electric machine 1. This configuration differs from the previous embodiment in that the notches 144 of the stator body 146 receiving the conductors and/or strands of the coil 45 have an open shape in cross-section: the notches 144 comprise a radially centripetal opening 145 which opens out at a radially inner face of the stator body 146. In order to close the notches 144 to allow circulation of coolant therein, a jacket 160 for closing the radially centripetal opening 145, coaxial with the stator body 146. The jacket 160 then completes the sealing means 60 described above. The jacket 160 can be formed in one piece with the wall 142 of the liner. Means are also provided for sealing the chamber at the connection between the jacket and the bottom wall 132 of the second casing cover 13.

According to an alternative embodiment of the rotary electric machine 1, the first coil head assembly is formed by a part of the first coil heads 43, for example, and the second coil head assembly by another part of the first coil heads 43. Thus, the first and second coil head assemblies project from the same longitudinal end face 411. Consequently, the first cooling chamber arranged around the first coil head assembly is in the shape of a portion of a ring. Likewise, the second cooling chamber arranged around the second coil head assembly is in the shape of a portion of a ring. For example, the ring portions of the first and second chambers, in combination, form a complete ring. Also for example, the first and second cooling chambers are semi-annular. Other partitions and numbers of cooling chambers are possible.

In this alternative embodiment of the rotary electric machine 1 according to the invention, the coil comprises a third coil head assembly formed by all or part of the second coil heads 42 projecting from the other 412 of the first 411 and second 412 longitudinal end faces. In particular, the third coil head assembly comprises the coil heads 42 associated with the notches 44 opening into the first cooling chamber, on the one hand, and on the other hand, the coil heads 42 associated with the notches 44 opening into the second cooling chamber. The rotary electric machine 1 then comprises a third cooling chamber in the shape of at least a portion of a ring arranged around this third coil head assembly. Thus, this third cooling chamber is in fluid communication with the first and second cooling chambers through the notches 44. The first and second cooling chambers are therefore in fluid communication with one another via the aforementioned notches 44. For example, if the ring portions of the first and second chambers form a complete ring, the third cooling chamber is an annular chamber. In addition, the third cooling chamber is produced in the same way as the first 14 and second 15 cooling chambers, as described above for the embodiment of the rotary electric machine 1 illustrated in the appended figures.

The operation of this alternative embodiment of the rotary electric machine is similar to that of the rotary electric machine 1 described above. For example, the coolant is introduced by the fluid communication means, which then become coolant intake means, into the first cooling chamber, which then forms a coolant inlet chamber. Preferably, the coolant is injected under pressure so as to optimally occupy a volume of the first cooling chamber: thus, the first coil head assembly is completely immersed in the coolant. Then, the coolant enters the associated notches 44 opening into the first cooling chamber and flows around and along the conductors and/or strands of the coil 45 in the gaps described above. Then, the coolant leaves these notches 44 toward the third cooling chamber, which it fills completely, thus flooding the third coil head assembly to cool them in turn optimally. Then, the coolant enters the associated notches 44 opening into the second cooling chamber and flows around and along the conductors and/or strands of the coil 45 in the gaps described above. The third cooling chamber forms a connecting chamber. Then, the coolant leaves these notches 44 toward the second cooling chamber, which the coolant fills completely, thus flooding the second coil head assembly to cool them in turn optimally. The second cooling chamber then forms a coolant discharge chamber. The coolant is finally discharged by the fluid communication means, which then becomes means for discharging coolant, associated with the second cooling chamber.

Other arrangements of the cooling chambers are possible.

In an alternative embodiment of the rotary electric machine 1, one of the first 12 and second 13 casing covers is secured to the casing body 11.

The rotary electric machine 1 which has just been described enables cooling of the coil 45, and therefore of the stator 40, by direct contact of the coolant with the conductors and/or strands of the coil 45 which is the source of heat to be discharged from the stator 40 of the rotary electric machine 1.

The rotary electric machine 1 which has just been described can be a synchronous or asynchronous machine. It is in particular a machine for traction or propulsion of electric motor vehicles (Battery Electric Vehicle) and/or hybrid motor vehicles (Hybrid Electric Vehicle—Plug-in Hybrid Electric Vehicle), such as passenger cars, vans, trucks, buses or coaches. The rotary electric machine 1 can be used in industrial and/or energy production applications, such as wind turbines, boats or submarines.

Of course, it is possible to make numerous modifications to the claimed invention without departing from the scope thereof.

The invention claimed is:

1. A rotary electric machine comprising a casing, a stator comprising a stator body secured within the casing and comprising first and second longitudinal end faces, notches arranged and extending longitudinally within the stator body between the first and second longitudinal end faces, a coil passing longitudinally through the stator body through the notches and comprising first and second coil head assemblies projecting from at least one of the first and second longitudinal end faces of the stator body, a first chamber in the shape of a ring portion arranged around the first coil head assembly and a second chamber in the shape of a ring portion arranged around the second coil head assembly, the first and second chambers being in fluid communication with one another by the notches, wherein one of the first and second chambers is a coolant inlet chamber and the other of the first and second chambers is a coolant discharge chamber such that a flow of coolant between the first and second annular chambers is forced into the notches while the rotary electric machine is in operation, the coil comprising a set of pins, the pins being hairpin conductors with flattened strands.

2. The machine according to claim 1, wherein the first coil head assembly protrudes from one of the first and second longitudinal end faces and the second coil head assembly protrudes from the other of the first and second longitudinal end faces.

3. The machine according to claim 1, wherein the first and second chambers are annular chambers.

4. The machine according to claim 1, wherein the ring portions of the first and second chambers form a complete ring.

5. The machine according to claim 1, wherein the first and second chambers are semi-annular chambers.

6. The machine according to claim 1, wherein the machine comprises intake means for coolant from the inlet chamber.

7. The machine according to claim 6, wherein the coolant intake means is positioned in an upper part of the casing.

8. The machine according to claim 1, wherein the machine comprises means for discharging coolant from the discharge chamber.

9. The machine according to claim 8, wherein the coolant discharge means is positioned in a lower part of the casing.

10. The machine according to claim 1, wherein a sealing means is provided at a connection between the chambers and the notches.

11. The machine according to claim 10, wherein the sealing means comprises an annular seal located centripetally with respect to the notches.

12. The machine according to claim 1,
wherein the notches have a closed shape in cross-section, or,
wherein the notches comprise a radially centripetal opening, the machine further comprising a jacket for closing the radially centripetal opening, the jacket being coaxial with the stator body.

13. The machine according to claim 1, wherein the stator body comprises a longitudinal stack of stator blades or plates.

14. A rotary electric machine comprising a casing, a rotor rotatably mounted in said casing, a stator surrounding said rotor, there being an air gap between the rotor and the stator, the stator comprising a stator body secured within the casing and comprising first and second longitudinal end faces, notches arranged and extending longitudinally within the stator body between the first and second longitudinal end faces, a coil passing longitudinally through the stator body through the notches and comprising first and second coil head assemblies projecting from at least one of the first and second longitudinal end faces of the stator body, a first chamber in the shape of a ring portion arranged around the first coil head assembly and a second chamber in the shape of a ring portion arranged around the second coil head assembly, the first and second chambers being in fluid communication with one another by the notches, wherein one of the first and second chambers is a coolant inlet chamber and the other of the first and second chambers is a coolant discharge chamber such that a flow of coolant between the first and second annular chambers is forced into the notches while the rotary electric machine is in operation, the notches have a closed shape in cross-section not open radially toward the air gap and are delimited by the stator body.

15. The machine according to claim 14, wherein the first and second chambers are delimited by a liner integral with a wall of the casing.

16. The machine according to claim 15, wherein the casing comprises first and second clamping bearings of the stator body, the liner being provided in the first and/or second clamping bearings.

17. The machine according to claim 14, wherein the coil comprises a set of pins.

18. The rotary electric machine according to claim 14 wherein the machine comprises gaps between the pins and between the pins and side walls of the notches such that the coolant enters the notches and flows around and along the pins in the gaps.

* * * * *